(12) United States Patent
Darby

(10) Patent No.: US 10,865,846 B2
(45) Date of Patent: Dec. 15, 2020

(54) DISC SPRING ASSEMBLY

(71) Applicant: Goodrich Actuation Systems Limited, West Midlands (GB)

(72) Inventor: Jonathan Darby, Staffordshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 16/286,868

(22) Filed: Feb. 27, 2019

(65) Prior Publication Data

US 2019/0293141 A1 Sep. 26, 2019

(30) Foreign Application Priority Data

Mar. 22, 2018 (EP) .................................... 18275043

(51) Int. Cl.
  *F16F 3/02* (2006.01)
  *F16F 1/32* (2006.01)
  *F16D 13/58* (2006.01)

(52) U.S. Cl.
  CPC ............... *F16F 3/023* (2013.01); *F16F 1/32* (2013.01); *F16F 3/02* (2013.01); *F16D 13/583* (2013.01); *F16F 2224/0208* (2013.01); *F16F 2230/0023* (2013.01); *F16F 2232/08* (2013.01); *F16F 2234/06* (2013.01); *F16F 2236/04* (2013.01); *F16F 2238/022* (2013.01)

(58) Field of Classification Search
  CPC ...... F16F 3/023; F16F 1/32; F16F 2230/0023; F16F 2224/0208; F16F 2236/04; F16F 2238/022; F16F 2232/08; F16F 2234/06; F16F 1/322

USPC .......................................................... 267/162
See application file for complete search history.

(56) References Cited

U.S. PATENT DOCUMENTS 2,912,564 A * 11/1959 Deffenbaugh ............ F16F 1/32
                                                          219/89
3,350,087 A * 10/1967 Haanes .................... F16F 9/061
                                                          267/162

(Continued)

FOREIGN PATENT DOCUMENTS

DE      3727989 A1    4/1989
EP      2886457 A1    6/2015

(Continued)

OTHER PUBLICATIONS

Extended European Search Report for International Application No. 18275043.0 dated Sep. 10, 2018, 8 pages.

*Primary Examiner* — Xuan Lan Nguyen
(74) *Attorney, Agent, or Firm* — Cantor Colburn LLP

(57) ABSTRACT

A disc spring assembly comprises a disc spring support having a radially outer surface and a plurality of annular disc springs arranged in a stack over the radially outer surface of the disc spring support. Each annular disc spring comprises a substantially frusto-conical or dished shape and has a radially inner edge region mounted on the radially outer surface of the disc spring support and a radially outer edge region. At least one separator disc is arranged between two axially adjacent disc springs and has a radially outer portion having opposed axially facing surfaces for receiving the radially outer edge regions of the two axially adjacent disc springs. The radially outer portion of the separator disc have at least one drainage passage for allowing drainage of a liquid from a cavity between the disc springs.

15 Claims, 4 Drawing Sheets

(56) References Cited

U.S. PATENT DOCUMENTS

| | | | | |
|---|---|---|---|---|
| 3,682,466 A * | 8/1972 | Huchette | ............... | F16F 1/32 |
| | | | | 267/161 |
| 3,856,242 A * | 12/1974 | Cook | ............... | F16F 1/32 |
| | | | | 248/548 |
| 4,799,654 A | 1/1989 | Eickmann | | |
| 5,669,598 A * | 9/1997 | Ticey | ............... | F16F 1/32 |
| | | | | 267/162 |
| 5,730,430 A * | 3/1998 | Hodson | ............... | F16F 1/32 |
| | | | | 267/162 |
| 7,918,432 B2 * | 4/2011 | Taylor, III | ............... | F16F 3/02 |
| | | | | 248/566 |
| 9,765,825 B2 * | 9/2017 | Stamps | ............... | B64D 35/04 |
| 2006/0090298 A1 * | 5/2006 | Kitamura | ............... | F16F 1/32 |
| | | | | 16/337 |

FOREIGN PATENT DOCUMENTS

| | | | |
|---|---|---|---|
| WO | 9406699 | A1 | 3/1994 |
| WO | 2009030017 | A1 | 3/2009 |

\* cited by examiner

DISC SPRING ASSEMBLY

FOREIGN PRIORITY

This application claims priority to European Patent Application No. 18275043.0 filed Mar. 22, 2018, the entire contents of which is incorporated herein by reference.

TECHNICAL FIELD

The present disclosure relates to disc spring assemblies as may be used, for example in gearboxes or clutches.

BACKGROUND

Disc spring assemblies are used in a wide range of applications. Typical applications include gearboxes, torque limiters or clutches where, for example, the disc spring assembly may be used to preload a clutch plate. A typical disc spring assembly comprises a plurality of disc springs abutting one another in a stack. Typically the disc spring has a frusto-conical or dished shape, and the disc springs are arranged back to back in an alternating fashion whereby one disc spring will contact the adjacent disc spring arranged to one side thereof at a radially inner edge region and the adjacent disc spring arranged to the other side thereof at a radially outer edge region. This has the effect that a cavity may be formed between adjacent disc springs. This may allow water or other liquids to accumulate between the disc springs. In certain environmental conditions, for example at high altitudes, the liquid may freeze leading to failure or poor performance.

SUMMARY

From a first aspect, the disclosure provides a disc spring assembly. The assembly comprises a disc spring support having a radially outer surface and a plurality of annular disc springs arranged in a stack over the radially outer surface of the disc spring support. Each annular disc spring comprises a substantially frusto-conical or dished shape and has a radially inner edge region mounted on the radially outer surface of the disc spring support and a radially outer edge region. The assembly further comprises at least one separator disc arranged between two axially adjacent disc springs. The separator disc has a radially outer portion having opposed axially facing surfaces for receiving the radially outer edge regions of the two axially adjacent disc springs. The radially outer portion of the separator disc further has at least one drainage passage formed therein for allowing drainage of a liquid from a cavity defined between the axially adjacent disc springs.

The assembly may comprise a plurality of drainage passages in the radially outer portion of the separator disc.

The plurality of drainage passages may be arranged circumferentially equi-spaced around the separator disc.

The separator disc may comprise a radially inner web. The radially outer portion of the separator disc may be a radially outer rim portion which extends axially beyond the radially inner web portion.

The at least one drainage passage may be formed as an axially extending slot through the radially outer rim portion.

The slot may be generally U-shaped.

The slot may extend, in certain embodiments, radially into the radially inner web portion of the separator disc.

The axially opposed surfaces of the separator disc may be planar surfaces.

The axially opposed surfaces of the separator disc may be parallel to one another.

The disc spring support may further comprise a radially outwardly extending flange, and a further separator disc may be provided between the radially outwardly extending flange and an adjacent disc spring. The further separator disc may have opposed axial surfaces for engaging the radially outwardly extending flange and a radially outer edge portion of the adjacent disc spring.

The assembly may further comprise an end ring mounted on the radially outer surface of the disc spring support at one end of the stack of annular disc springs. The end ring may be axially displaceable along the radially outer surface.

The disclosure also provides a separator disc for separating adjacent disc springs. The separator disc has a radially outer portion having opposed axially facing surfaces for receiving radially outer edge regions of the adjacent disc springs. The radially outer portion of the separator disc has at least one drainage passage formed therein extending from a radially inner location to a radially outer location.

The separator disc may comprise comprises a radially inner web and a radially outward rim portion which extends axially beyond the radially inner web portion. The axially facing opposed surfaces may be formed on the radially outer rim portion and the drainage passage may extend radially through the outer rim portion.

The drainage passage may be formed as an axially extending slot through the radially outer rim portion and it may optionally extend into the radially inner web portion.

The separator disc may further comprise any of the other features discussed above.

The disclosure also provides a method of preventing accumulation of liquid in a cavity defined between adjacent disc springs in a disc spring assembly. The method comprises positioning a separator disc between the disc springs. The separator disc has a radially outer portion having opposed axially facing surfaces for receiving radially outer edge regions of the disc springs. The radially outer portion of the separator disc has at least one drainage passage formed therein for allowing liquid to drain from the cavity.

DETAILED DESCRIPTION

Figure 1:
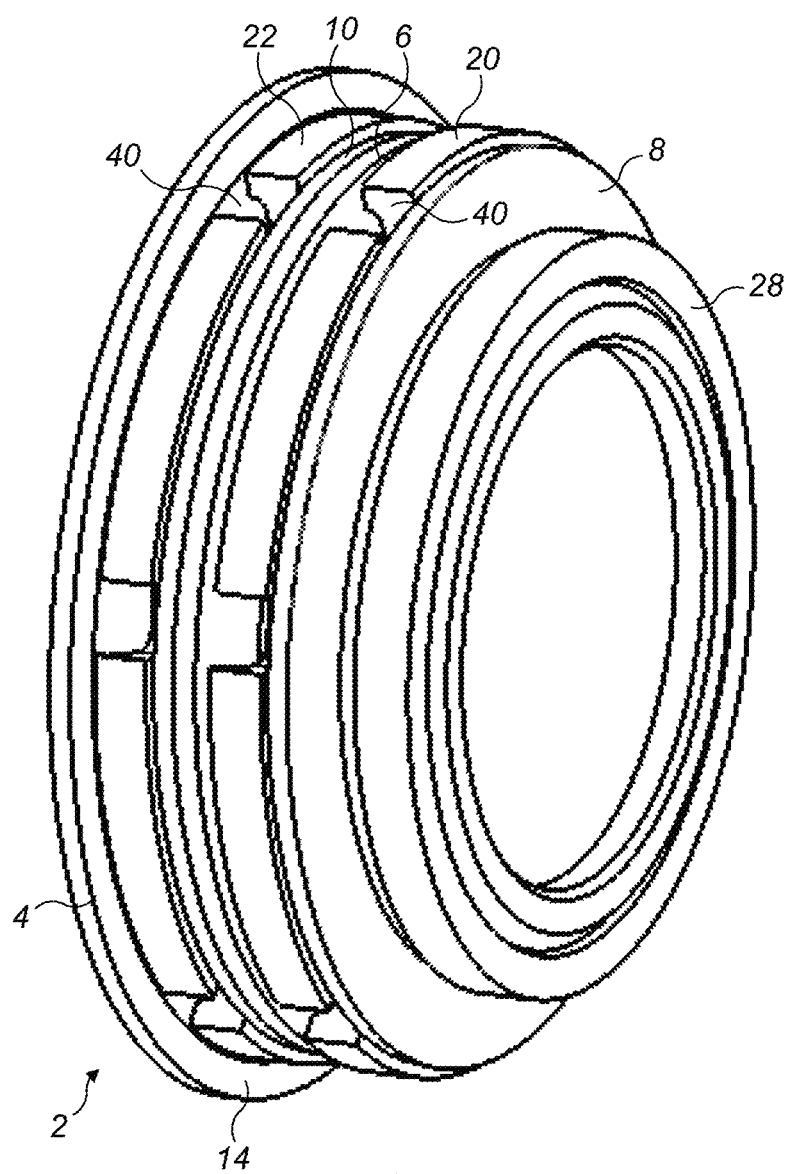
FIG. 1 shows a perspective view of a disc spring assembly in accordance with the disclosure.
Figure 2:
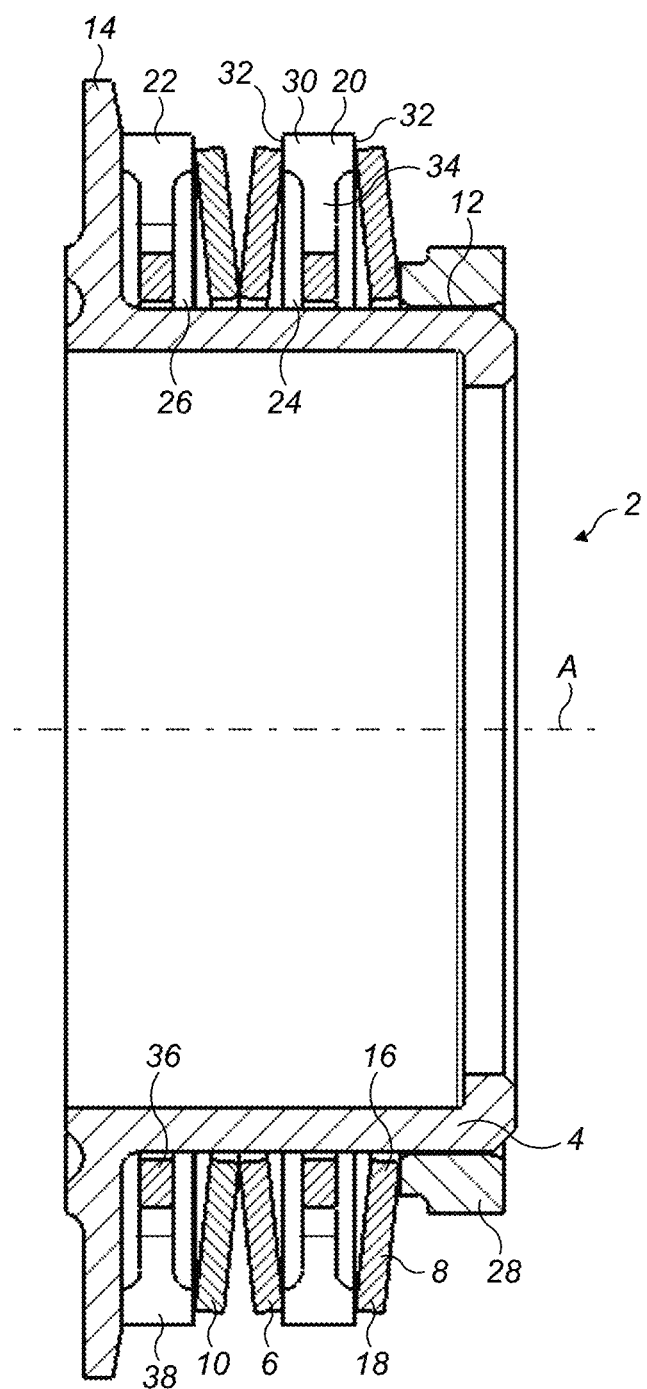
FIG. 2 shows a vertical section through the disc spring assembly of FIG. 1.

With reference to FIGS. 1 and 2, a disc spring assembly 2 is illustrated. Such a disc spring assembly 2 may be used in, for example, vented gearboxes as may be used in aircraft flight control systems. As discussed above, cavities formed between adjacent disc springs can act as water traps that can potentially collect moisture and build up a water reservoir that could eventually freeze leading to unit failure or performance issues. The embodiments of the disclosure described hereinafter mitigate this issue.

The disc spring assembly 2 comprises a disc spring support 4 and a plurality of annular disc springs 6, 8, 10 mounted thereon. The disc spring support 4 is, in this embodiment, an annular support having a radially outer surface 12 over which the plurality of annular disc springs 6, 8, 10 are mounted in a stack. In other embodiments, the disc spring support 4 may be a solid shaft. The disc spring support 4 may be mounted for rotation about its longitudinal axis A.

In the illustrated embodiment, only three annular disc springs 6, 8, 10 are illustrated. It will be understood that there may be as few as two disc springs 6, 8 10 or more than three disc springs 6, 8, 10.

The disc spring support 4 further comprises a radially outwardly extending flange 14 which acts as a stop for the stack of annular disc springs 6, 8, 10. In this embodiment, the radially outwardly extending flange 14 is shown as integrally formed with the disc spring support 4, although in other embodiments, it may be a separate element suitably mounted to the disc spring support 4.

As can be seen from FIG. 2, each annular disc spring 6, 8, 10 has a generally frusto-conical or dished shape, having a radially inner edge region 16 which is received on the radially outer surface 12 of the disc spring support 4 and a radially outer edge region 18. The disc springs 6, 8, 10 are arranged in an alternating manner such that the radially outer edge region 18 of a first disc spring 6 is adjacent the radially outer edge region 16 of an adjacent second disc spring 8 and the radially inner edge region 16 of the first disc spring 6 is adjacent the radially inner edge region 16 of an adjacent third disc spring 10.

A first separator disc 20 is arranged between the radially outer edge regions 16 of first and second axially adjacent disc springs 6, 8. A second separator disc 22 is arranged between the third annular disc spring 10 and the radially outwardly extending flange 14 of the support 4. The separator discs 20, 22 will be described further below.

It will be seen that a first cavity 24 is formed between the first and second disc springs 6, 8 and that the first separator disc 20 is arranged within that first cavity 24. A second cavity 26 is formed between the third disc spring 10 and the radially outwardly extending flange 14 and the second separator disc 22 is arranged within that second cavity 26.

The assembly 2 further comprises an end ring 28 mounted on the radially outer surface 12 of the support 4 at the opposite end of the disc ring stack from the radially outwardly extending flange 14. The end ring 28 will be axially displaceable along the radially outer surface 12 and operatively coupled to a further component being spring loaded by the stack, such as a clutch plate or the like.

Turning now to the separator discs 20, 22, each disk comprises a radially outer portion 30 having opposed axial surfaces 32, 32 for receiving the radially outer edge regions 18 of an adjacent disc spring 6, 8, 10. The radially outer portion 30 has at least one drainage passage 34 formed therein for allowing drainage of liquid from the first or second cavities 24, 26. The separator discs 20, 22 may be made from any suitable material. They may advantageously be made from a corrosion resistant and/or wear resistant material such as stainless steel in certain embodiments.

Figure 4:
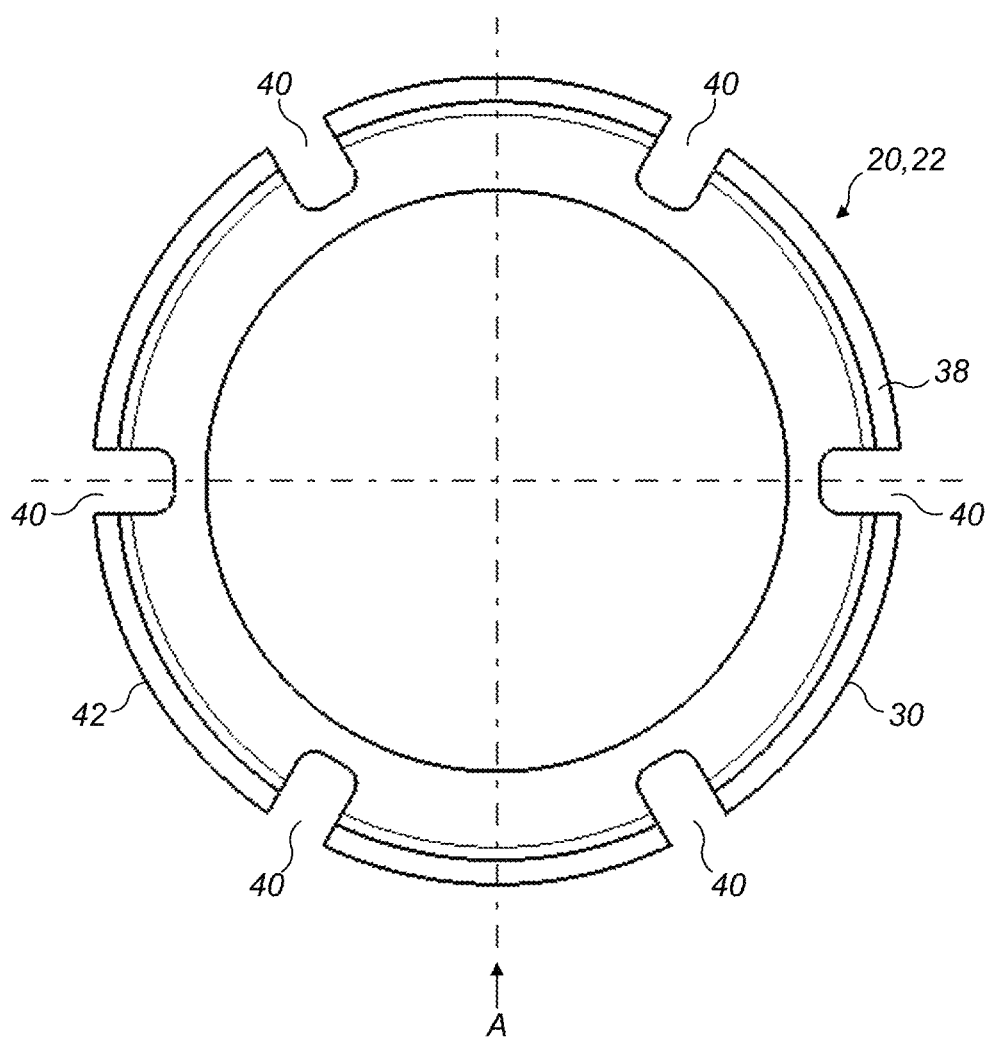
FIG. 4 shows a plan view of a separator disc in accordance with the disclosure.

In this embodiment, each separator disc 20, 22 comprises a plurality of drainage passages 34. Although six drainage passages 34 are illustrated (see FIG. 4), there may be more or fewer passages 34 provided. The plurality of drainage passages 34 are arranged circumferentially equi-spaced around the separator disc 22, 24 although other arrangements may be envisaged.

Each separator disc 20, 22 comprises a radially inner web portion 36 and a radially outer rim portion 38 which extends axially beyond the web portion 36. The web portion 36 is received over the radially outer surface 12 of the disc spring support 4. The opposed axial surfaces 32 for receiving the radially outer edge regions 18 of the disc springs 6, 8, 10 (or engaging the radially outwardly extending flange 12 of the disc spring support 4) are formed in the radially outer rim portion 38 of the separator disc 20, 22.

In this embodiment, the opposed axial surfaces 30, 32 are flat, planar surfaces. This may be advantageous in that it provides a controlled surface for the disc springs 6, 8, 10, avoiding the possible need to provide a flat peripheral region on the disc springs 6, 8, 10.

The axially opposed surfaces of the separator disc 20, 22 are parallel to one another and arranged parallel to the central transverse axis of the separator disc 20, 22.

Figure 3:
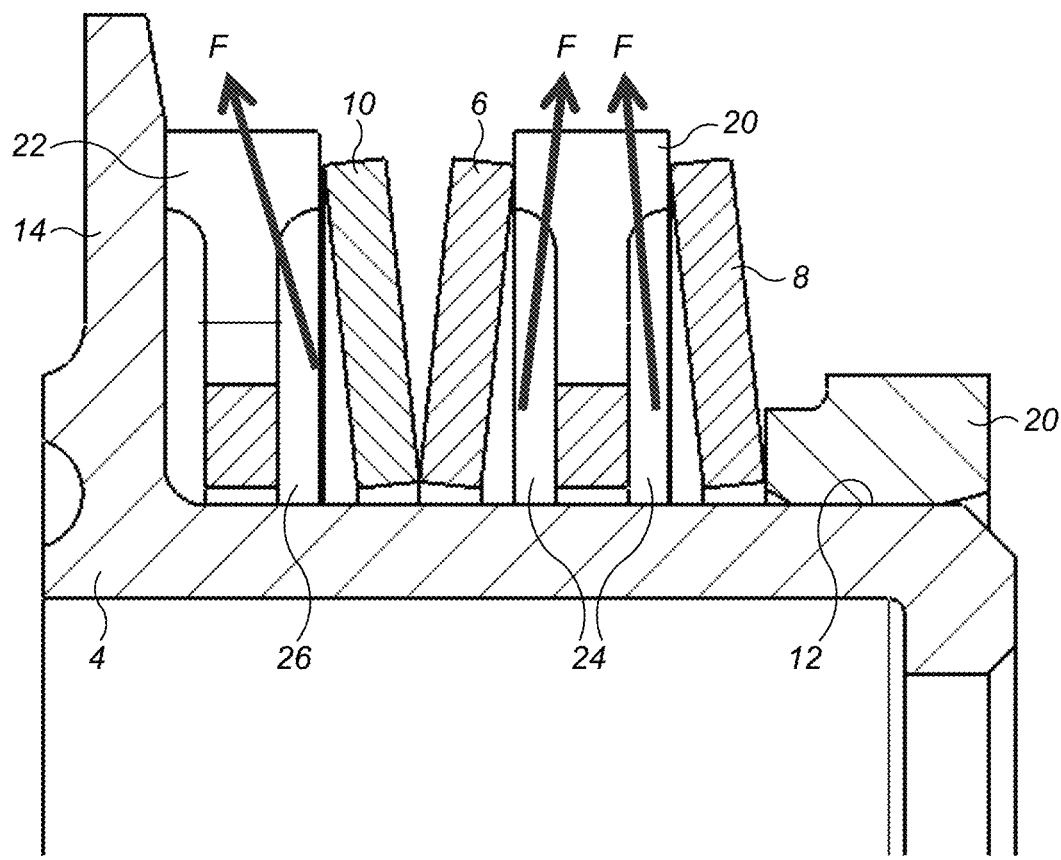
FIG. 3 shows a detail of FIG. 2 illustrating fluid flow paths through the disc spring assembly.
Figure 5:
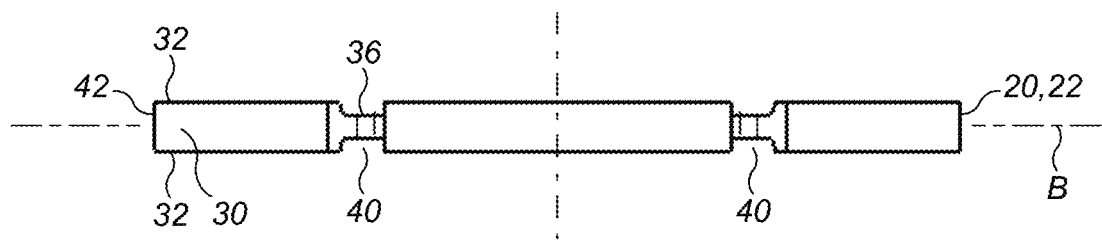
FIG. 5 shows a view along arrow A in FIG. 4.

The drainage passages 34 are formed as axially extending slots 40 formed through the outer rim portion 38. In this embodiment, the slots 40 are generally U-shaped. The slots 40 extend into the radially inner web portion 36 of the separator disc 20, 22 so as to provide fluid drainage paths F (FIG. 3) from the cavities 24, 26 to a radially outer surface 42 (FIGS. 4, 5) of the separator 20, 22 and thereby out of the disc spring assembly 2. Of course, the drainage passages 34 may be formed in other ways. In other embodiments for example, the drainage passages 34 may be formed as radially extending holes formed through the radially outer rim portion 38 of the separator disc 20, 22 to the radially outer surface 42 of the separator disc 20, 22. In other embodiments, respective radially extending slots may be formed in each axially facing surface 32 extending from the cavities 24, 26 to the radially outer surface 42 of the separator discs 20, 22.

As discussed above, in use liquid may accumulate in the cavities 24, 26 of the disc spring assembly 2. This may be as a result of liquid, for example water, being forced into the cavities 24, 26 as a result of the device in which the disc spring assembly 2 is incorporated being subjected to spray. It could also be due to condensation of liquid within the cavities 24, 26 during operation of the device, for example due to temperature cycling as may be experienced due to movement from low to high altitudes as may occur in an aircraft. The disc spring assembly 2 of embodiments of the disclosure mitigates this problem as the drainage passages 34 will allow accumulated liquid to drain from the cavities 24, 26, either due to centrifugal force, if the assembly 2 rotates, and/or by gravity.

It will be understood that the above description is of an exemplary embodiment only and that various modifications may be made to the disclosed embodiment without departing from the scope of the disclosure. Some of these modifications have been discussed in the description, but others will be readily apparent to the skilled person.

The invention claimed is:

1. A disc spring assembly comprising:
   a disc spring support having a radially outer surface;
   a plurality of annular disc springs arranged in a stack over the radially outer surface of the disc spring support, each annular disc spring comprising a substantially frusto-conical or dished shape and having a radially inner edge region mounted on the radially outer surface of the disc spring support and a radially outer edge region; and
   at least one separator disc arranged between two axially adjacent disc springs;
   the separator disc having a radially outer portion having opposed axially facing surfaces for receiving the radially outer edge regions of the two axially adjacent disc springs, the radially outer portion of the separator disc having at least one drainage passage formed therein for allowing drainage of a liquid from a cavity defined between the axially adjacent disc springs.

2. A disc spring assembly as claimed in claim 1, comprising a plurality of drainage passages in the radially outer portion of the separator disc.

3. A disc spring assembly as claimed in claim 2, wherein the plurality of drainage passages are arranged circumferentially equi-spaced around the separator disc.

4. A disc spring assembly as claimed in claim 1, wherein the separator disc comprises a radially inner web and wherein the radially outer portion of the separator disc is a radially outer rim portion which extends axially beyond the radially inner web portion.

5. A disc spring assembly as claimed in claim 4, wherein the at least one drainage passage is formed as an axially extending slot formed through the radially outer rim portion (38).

6. A disc spring assembly as claimed in claim 5, wherein the slot is generally U-shaped.

7. A disc spring assembly as claimed in claim 5, wherein the slot extends radially into the radially inner web portion.

8. A disc spring assembly as claimed in claim 1, wherein the axially opposed surfaces of the separator disc are planar surfaces.

9. A disc spring assembly as claimed in claim 8, wherein the axially opposed surfaces of the separator disc are parallel to one another.

10. A disc spring assembly as claimed in claim 1, wherein the disc spring support further comprises:
   a radially outwardly extending flange, and
   wherein a further separator disc is provided between the radially outwardly extending flange and an adjacent disc spring of the plurality of annular disc springs, the further separator disc having opposed axial surfaces for engaging the radially outwardly extending flange and a radially outer edge portion of the adjacent disc spring.

11. A disc spring assembly as claimed in claim 1, further comprising:
   an end ring mounted on the radially outer surface of the disc spring support at one end of the stack of annular disc springs, the end ring being axially displaceable along the radially outer surface.

12. A separator disc for separating adjacent disc springs, the separator disc comprising:
   a radially outer portion having opposed axially facing surfaces for receiving radially outer edge regions of the adjacent disc springs,
   wherein the radially outer portion of the separator disc has at least one drainage passage formed therein extending from a radially inner location to a radially outer location.

13. A separator disc as claimed in claim 12, wherein the separator disc comprises a radially inner web and a radially outward rim portion which extends axially beyond the radially inner web portion, the axially facing opposed surfaces being formed on the radially outer rim portion, the drainage passage extending radially through the outer rim portion.

14. A separator disc as claimed in claim 13, wherein the drainage passage is formed as an axially extending slot formed through the radially outer rim portion and optionally extending into the radially inner web portion.

15. A method of preventing accumulation of liquid in a cavity defined between adjacent disc springs in a disc spring assembly, the method comprising:
   positioning a separator disc between the disc springs, the separator disc having a radially outer portion having opposed axially facing surfaces for receiving radially outer edge regions of the disc springs, the radially outer portion of the separator disc having at least one drainage passage formed therein for allowing liquid to drain from the cavity.

* * * * *